(12) United States Patent
 Cengil et al.

(10) Patent No.: US 10,259,343 B2
(45) Date of Patent: Apr. 16, 2019

(54) METHOD AND APPARATUS FOR ADJUSTING AT LEAST A FIRST MOVABLE SEAT ELEMENT OF A VEHICLE SEAT

(71) Applicant: Volkswagen Aktiengesellschaft, Wolfsburg (DE)

(72) Inventors: Sükrü Cengil, Burgwedel (DE); Andrea Schnurr, Mariental (DE); Marina Belun, Hannover (DE); Jan Peter Herdey, Braunschweig (DE); Oliver Wolf, Wolfsburg (DE)

(73) Assignee: VOLKSWAGEN AKTIENGESELLSCHAFT, Wolfsburg (DE)

(*) Notice: Subject to any disclaimer, the term of this patent is extended or adjusted under 35 U.S.C. 154(b) by 130 days.

(21) Appl. No.: 15/638,418

(22) Filed: Jun. 30, 2017

(65) Prior Publication Data
US 2018/0001789 A1   Jan. 4, 2018

(30) Foreign Application Priority Data

Jun. 30, 2016 (EP) ..................... 16177354

(51) Int. Cl.
*B60R 22/00* (2006.01)
*B60N 2/02* (2006.01)
(Continued)

(52) U.S. Cl.
CPC ............ *B60N 2/0224* (2013.01); *B60K 37/06* (2013.01); *B60N 2/0228* (2013.01);
(Continued)

(58) Field of Classification Search
CPC ...... B60N 2/0224; B60N 2/99; B60N 2/0228; B60N 2/0284; B60N 2/986; B60N 2002/0288; B60R 11/0264; B60K 37/06
(Continued)

(56) References Cited

U.S. PATENT DOCUMENTS 7,851,719 B2 * 12/2010 Dzioba ................ B60N 2/0228
                                              200/512
8,239,087 B2 *  8/2012 Dybalski ................ B60K 35/00
                                              345/156
(Continued)

FOREIGN PATENT DOCUMENTS

DE            4132499 A1    4/1993
DE      202005009934 U1     9/2005
(Continued)

OTHER PUBLICATIONS

"Seat Lumbar Switch," URL: http://forums.m3cutters.co.uk/showthread.php?t=156074, 2 pages, Jun. 19, 2016.
(Continued)

*Primary Examiner* — Shardul D Patel
(74) *Attorney, Agent, or Firm* — Slayden Grubert Beard PLLC (57) ABSTRACT

A method and device are provided for adjusting at least a first movable seat element of a vehicle seat, in which a graphic element of the vehicle seat to be adjusted is displayed with at least one graphic element of the first seat element on a display surface, in order to adjust the first seat element a first switching element and a second switching element are displayed on the display surface, wherein the first switching element comprises a first graphic arrow element and the second switching element comprises a second graphic arrow element, which graphic arrow elements distinguish opposite directions for moving the first seat element, and on actuating the first switching element a control signal is generated, by means of which the first seat element is moved in a first direction and, at the same time, the graphic element of the first seat element is moved.

15 Claims, 8 Drawing Sheets

(51) Int. Cl.
  *B60K 37/06* (2006.01)
  *B60R 11/02* (2006.01)
  *B60N 2/90* (2018.01)

(52) U.S. Cl.
  CPC ............ *B60N 2/0284* (2013.01); *B60N 2/99* (2018.02); *B60R 11/0264* (2013.01); *B60N 2/986* (2018.02); *B60N 2002/0288* (2013.01)

(58) Field of Classification Search
  USPC ........ 701/49; 297/217.3; 200/600, 310, 313, 200/314; 345/173
  See application file for complete search history.

(56) References Cited

U.S. PATENT DOCUMENTS

| | | | | |
|---|---|---|---|---|
| 8,596,716 | B1* | 12/2013 | Caruso | B60N 2/90 297/217.3 |
| 2006/0036335 | A1* | 2/2006 | Banter | B60K 35/00 700/17 |
| 2009/0021041 | A1* | 1/2009 | Ritzel | B60N 2/0228 296/65.18 |
| 2009/0088930 | A1* | 4/2009 | Ohtsubo | B60N 2/0252 701/49 |
| 2009/0210110 | A1* | 8/2009 | Dybalski | B60K 35/00 701/31.4 |
| 2010/0066137 | A1* | 3/2010 | Sakai | B60N 2/002 297/217.3 |

FOREIGN PATENT DOCUMENTS

| | | | |
|---|---|---|---|
| EP | 2163420 A2 | 3/2010 | |
| JP | 2011162007 A | 8/2011 | ............... B60N 2/02 |

OTHER PUBLICATIONS

Korean Office Action, Application No. 2018058360737, 12 pages, dated Aug. 28, 2018.

Search Report of the European Patent Office (EPO) dated Jan. 3, 2017 in application No. EP 16177354.4.

* cited by examiner

METHOD AND APPARATUS FOR ADJUSTING AT LEAST A FIRST MOVABLE SEAT ELEMENT OF A VEHICLE SEAT

CROSS-REFERENCE TO RELATED APPLICATIONS

This application claims the benefit of European Patent Application 16177354.4, filed on Jun. 30, 2016 with the European Patent Office. The contents of the aforesaid European Patent Application is incorporated herein in its entirety for all purposes.

BACKGROUND

The present invention relates to a method for adjusting at least a first movable seat element of a vehicle seat. In addition, the invention relates to a device for adjusting at least a first movable seat element of a vehicle seat having a first adjusting apparatus for moving the first seat element and a display device having a display surface for displaying a graphic element of the vehicle seat to be adjusted which comprises at least a graphic element of the first seat element.

In modern vehicles and in particular in motor vehicles, a plurality of devices are provided, which can be electronically operated. In many cases, these devices are therefore no longer operated by means of mechanical operating elements, but instead using a user interface, which comprises a display surface and an assigned input apparatus, such as e.g. a touch-sensitive surface. Since a direct relationship no longer exists between an operating element and the device to be operated in the case of such operating systems, this provides the challenge that the operating concept and the information displayed in connection with the operation should be simple, intuitive, and easy to understand for the user.

The seat elements of the vehicle seat were originally adjusted by means of mechanical operating elements, which were directly coupled with the seat elements to be adjusted. Electric seat element adjusting apparatuses are also used to offer the user greater comfort. In this case, electric controls are arranged on the vehicle seat, during the actuation of which control signals are transmitted to actuators which electrically adjust the seat elements. Such electric seat element adjusting apparatuses are not, however, integrated into a general operating concept which uses a central display device with a touch-sensitive surface. The disadvantage of such seat element adjusting apparatuses is the requirement for increased installation space in the interior of the vehicle and the higher costs associated with the fact that separate electrical operating elements have to be arranged on the vehicle seat.

SUMMARY

An object of the present invention is therefore to provide a method and a device of the type indicated above, which can be integrated into an operating concept which is based on the display of information on a display surface and which provides increased operability.

This object is solved according to the invention by a method having the features of claim 1 and a device having the features of claim 12. Embodiments of the invention are set out in the dependent claims and the following description.

According to the method according to the invention, a graphic element of the vehicle seat to be adjusted is displayed with at least one graphic element of the first seat element on a display surface. In order to adjust the first seat element, a first switching element and a second switching element are displayed on the display surface, wherein the first switching element comprises a first graphic arrow element and the second switching element comprises a second graphic arrow element, which graphic arrow elements indicate opposite directions for moving the first seat element. On actuating the first switching element a control signal is generated, by means of which the first seat element is moved in a first direction and, at the same time, the graphic element of the first seat element is moved.

DETAILED DESCRIPTION OF EMBODIMENTS

In one embodiment, a display surface having a touch-sensitive surface, i.e., a so-called touchscreen, may be used as the input apparatus. In this way, the operation for adjusting the first seat element can be integrated into a general operating concept which uses the display surface having the touch-sensitive surface. No further mechanical or electrical operating elements thus would be required. In this way, the method according to this embodiment can be implemented in a very cost-effective manner. Furthermore, installation space can be saved in the interior of the vehicle.

In addition, on adjusting the first seat element, not only does the user receive direct feedback through the seat which moves on actuating the first switching element, but also visual feedback on the display surface since the graphic element of the first seat element moves at the same time. In this way, a method for adjusting the first seat element, which is very easy to learn and intuitive to operate is provided.

Similarly to the function of the first switching element, a control signal may in one embodiment be generated on actuating the second switching element, by means of which control signal the first seat element is moved in an opposite direction to the first direction. In this case, the graphic element of the first seat element may also moved at the same time.

For example, on actuating the first or the second switching element, the graphic element of the first seat element may be moved back and forth and following the end of the actuation of the first or second switching element, the graphic element of the first seat element returns to an initial state.

Herein, actuation means in particular that an actuating object touches the touch-sensitive surface on the switching element. The actuation is terminated when the actuating object is no longer touching the switching element. In this case, the back and forth movement of the graphic element for the seat element illustrates the degrees of freedom of the movement for this seat element. As a result, the movement possibilities of the seat element are illustrated to the user.

The actuating object may be, for example, the fingertip of a user, an actuating pin, or any other object.

According to a further embodiment of the method according to the invention, on actuating the first or the second switching elements, the graphic element of the first seat element is moved in a direction corresponding to the first direction or is moved in a direction corresponding to the opposite direction. The direction of movement of a graphic element refers to the direction, which the user perceives as a result of the representation of the vehicle seat by means of the graphic element. The actual movements of the seat element are therefore, at least with regard to the direction, transformed directly into movements in the representation of the graphic elements for the seat element.

According to a further embodiment of the method according to the invention, the vehicle seat has a pair of seat elements comprising a second seat element and a third seat element, which can be moved towards one another and away from one another. In this case, graphic elements for the second and third seat elements are displayed on the display surface of the graphic element of the vehicle seat to be adjusted. In order to adjust the pair of seat elements, a third switching element, which comprises a third graphic arrow element, and a fourth graphic arrow element which point away from one another, and a fourth switching element which comprises a fifth arrow element and a sixth arrow element which point towards one another are displayed on the display surface. On actuating the third switching element, a control signal is generated, by means of which the second seat element and the third seat element of the pair of seat elements are moved away from one another and, at the same time, the graphic elements of the second and third seat elements are moved. On actuating the fourth switching element a control signal is generated, by means of which the second and third seat elements of the pair of seat elements are moved towards one another and, at the same time, the graphic elements of the second and third seat elements are moved. As a result, seat elements, which can be moved towards one another and away from one another can also be adjusted, wherein the adjustment thereof can also be integrated into the operating concept, which is based on the information display of the display surface.

On actuating the third switching element, the graphic elements of the second and third seat elements are in an embodiment moved away from one another and on actuating the fourth switching element, the graphic elements of the second and third seat elements are in an embodiment moved towards one another. In this way, a direct implementation of the actual movement of the seat elements can be provided, such that the representation on the display surface is very intuitively comprehensible to the user and the feedback conveyed by the vehicle seat coincides with the visual feedback via the display surface.

In addition, it is possible in an embodiment that during an actuation of the third or fourth switching element, the graphic elements of the second and third seat elements are moved back and forth towards one another and away from one another and, following the termination of the actuation of the third or fourth switching element, the graphic elements of the second and third seat elements return to an initial state. This illustrates the movement possibilities of the seat elements of the pair of seat elements to the user.

According to another embodiment, the vehicle seat has a further pair of seat elements comprising a fourth seat element and a fifth seat element, which can be moved towards one another and away from one another. The graphic element of the vehicle seat to be adjusted displays graphic elements for the fourth and fifth seat elements on the display surface. In order to adjust the further pair of seat elements, a fifth switching element which comprises a seventh graphic arrow element and an eighth graphic arrow element which point away from one another, and a sixth switching element which comprises a ninth arrow element and a tenth arrow element which point towards one another are displayed on the display surface. On actuating the fifth switching element, a control signal is generated, by means of which the fourth and fifth seat elements of the further pair of seat elements are moved away from one another, at the same time, the graphic elements of the fourth and fifth seat elements are moved. On actuating the sixth switching element a control signal is generated, by means of which the fourth and fifth seat elements of the further pair of seat elements are moved towards one another and, at the same time, the graphic elements of the fourth and fifth seat elements are moved. The graphic elements for the further pair of seat elements are shown, in an embodiment, in the same way as the representation of the graphic elements for the pair of seat elements. In this way, seat elements of a vehicle seat which can be moved towards one another and away from one another can be completely adjusted by the method according to the above embodiments.

According to another embodiment, the movement of the graphic elements for one of the seat elements or for the seat elements corresponds to the movement of the respective seat element or the respective seat elements. In another embodiment, the real movements of the seat elements of the vehicle seat are synchronously reproduced on the display surface by the movements of the corresponding graphic elements of said seat elements. To this end, confirmation signals are transmitted back in particular by the adjusting apparatuses for the seat elements to a control device such that the latter can generate the movement of the graphic elements for the seat elements synchronously with the actual movement of the seat elements.

The seat depth of the vehicle seat is in one embodiment changed by the back and forth movement of the first seat element. The second and third seat elements of the pair of seat elements are in another embodiment seating surface side panels. The fourth and fifth seat elements of the further pair of seat elements are in another embodiment back surface side panels.

The graphic element of the vehicle seat is, in one embodiment, a perspective representation of the vehicle seat. The graphic arrows are in another embodiment represented as arrow buttons which are shown in a perspective view. These arrow buttons of the graphical arrow representations are in a further embodiment aligned parallel to the planes belonging to the seat elements. In these embodiments, the plane of the seating surface of the vehicle seat belongs to the seating surface side panels and the plane of the back surface of the vehicle seat belongs to the back surface side panels. In addition, the first and second arrow elements may in a corresponding embodiment be shown in the alignment direction of the graphic element of the seating surface. The further arrow elements may accordingly be shown in the alignment direction with respect to the seating surface or the back surface of the graphic element for the vehicle seat.

According to an embodiment, the graphic elements of the seat elements are configured as switching elements. By means of an actuation of one of these switching elements, the respective seat element or the respective pair of seat elements is selected. The user can therefore not only adjust various seat elements of the vehicle seat by means of the representation on the display surface, but can also select the seat elements to be adjusted by means of the display surface.

The term switching element is used in the context of the invention to denote a control element of a graphical user interface. A switching element differs from elements and surfaces for purely displaying information, so-called display elements, in that they are selectable. Upon selecting a switching element, a function assigned thereto is executed. The function can only result in a change in the information display. In addition, apparatuses can be controlled by means of the switching elements, the operation of which is supported by the information display. The switching elements can, therefore, replace conventional mechanical switches. The switching elements can be generated at will for a freely programmable display surface and can be displayed by the latter. In addition, it can be provided that a switching element can be marked. The assigned function is not yet executed in this case. The marked switching element is, however, shown highlighted with respect to other switching elements. Only upon selecting the switching element is the function assigned thereto executed.

According to another embodiment, an animation is reproduced on the display surface, if a transition from a selection of a first seat element is made to a selection of a different seat element, for example to of the pair of seat elements having the second and third seat elements. During the animation, the first graphic arrow element first turns into a double-headed arrow, which is then divided into the third and fourth graphic arrow elements. The second graphic arrow element first turns into a bar which is then divided into the third and fourth graphic arrow elements. In this way and due to the graphic elements, the user can very easily and intuitively identify the change in the selection of the seat element.

According to another embodiment, a selected seat element or selected seat elements is/are shown highlighted by means of an area fill in the graphic element of the vehicle seat.

In the case of the animation, the area fill for highlighting the graphic element of the first seat element then disappears and the area fill for highlighting the graphic element of the other seat element, in particular the graphic elements of the pair of seat elements, appears, wherein the disappearance and the appearance of the area fill are shown in the form of a flow of a fluid from the graphic element of the first seat element to the graphic element of the other seat element, i.e., in particular the graphic elements of the pair of seat elements. The animation is in one embodiment effected in the form of a real translucent gel-like fluid flowing from the one seat element into the other seat element(s). The highlighting is therefore in particular not only faded in or out, but the flow shown in the graphic elements illustrates the transition of the selection to other seat elements in an intuitively identifiable manner.

According to another embodiment, an actuating object approaching a touch-sensitive surface of an input apparatus is detected and if the actuating object approaching the touch-sensitive surface has been detected, switching elements which can be actuated are shown highlighted. The switching elements can, in particular, be shown highlighted in that contours with respect to the corresponding switching elements are shown. In addition, the switching elements can be shown in a different brightness or a different contrast. In this way, the user can discover by means of an actuating object such as, for example, his fingertip approaching the touch-sensitive surface, which seat elements can be adjusted by means of the touch-sensitive surface.

A device according to a further aspect of the invention comprises a control device, which is coupled using a data transmitting link with the first adjusting apparatus and the display device, and which is configured, on actuating the first switching element, to generate a control signal, by means of which the first seat element is moved in a first direction and, at the same time, the graphic element of the first seat element is moved.

The device according to the present aspect is, in particular, configured such that it can perform the above-mentioned steps of the discussed method partially or completely. Therefore, the device provides the same advantages as the method discussed.

The control device of the device according to the present aspect may in one embodiment, be configured to control the movements of further seat elements, as has been described above and, at the same time, to generate corresponding displays on the display surface of the display device, as has also been explained in the preceding.

In one embodiment, the back and forth movement of the first seat element in particular changes the seat depth of the vehicle seat. The movement towards one another and the movement away from one another of the pair of seat elements in another embodiment changes the width of the seating surface or back surface.

According to a further embodiment, said device has a touch-sensitive surface for actuating the switching elements. In addition, the device may in another embodiment comprise an approach detection device, with which an actuating object approaching the touch-sensitive surface can be detected. The touch-sensitive surface may in another embodiment be configured on the display surface, such that a touch screen is provided. In this way, the first seat element and, if applicable, the further seat elements can be adjusted by means of a central operating apparatus which is also used for other functions of the vehicle. The device for adjusting the seat element can be integrated into the operating concept. Separate mechanical or electrical switches are not necessarily required such that the device can be integrated into a vehicle very inexpensively and in an installation space-saving manner.

BRIEF DESCRIPTION OF THE DRAWINGS

The invention will now be explained by another exemplary embodiment with reference to the drawings, wherein FIG. 1 schematically shows the setup of an exemplary embodiment of the device according to the invention.

Figure 1:
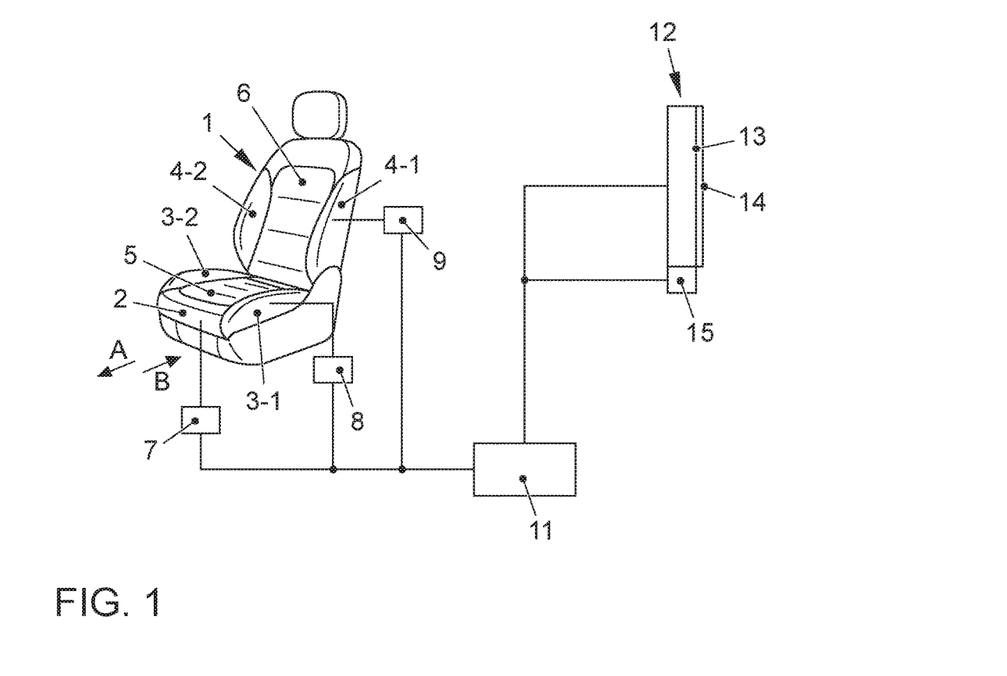

The structure of the exemplary embodiment of the device according to the invention is first explained with reference to FIG. 1:

A vehicle seat 1, which has a knee element 2 as a first seat element is arranged in a vehicle. In addition, the vehicle seat 1 comprises seating surface side panels 3-1 and 3-2 as well as back surface side panels 4-1 and 4-2. A seating surface 5 which, towards the front, turns into the knee element 2 is located between the seating surface side panels 3-1, 3-2. A back surface 6 is located between the back surface side panels 4-1, 4-2.

The knee element 2 can be moved back and forwards in the direction of arrows A and B. To this end, a first adjusting apparatus 7 comprises, in particular, a motor and a motor control. The seat depth of the vehicle seat 1 can be increased and reduced by means of a movement of the knee element 2.

The seating surface side panels 3-1 and 3-2 are coupled with a second adjusting apparatus 8 which can move the seating surface side panels 3-1, 3-2 towards one another and away from one another. The seat width can be changed as a result of this. To this end, the second adjusting apparatus also comprises a motor and a motor control.

Finally, the back surface side panels 4-1 and 4-2 are also coupled with a third adjusting apparatus 9 which also comprises a motor and a motor control and by means of which the back surface side panels can be moved towards one another and away from one another. The width of the back surface can be adjusted in this way.

The adjusting apparatuses 7, 8, 9 are coupled with a control device 11 which can control the adjusting apparatuses 7, 8, 9 such that the knee element 2, the seating surface side panels 3-1, 3-2 and the back surface side panels 4-1, 4-2 can be moved. The seating surface side panels 3-1, 3-2 constitute a pair of seat elements which can only be moved jointly. Similarly, the back surface side panels 4-1, 4-2 constitute a further pair of seat elements which can only be adjusted jointly.

In addition, the control device 11 is coupled over a data transmitting link with a display device 12. The control device 11 comprises a display surface 13 on which a touch-sensitive surface 14 is configured. A so-called touchscreen is therefore provided.

In addition, the display device 12 comprises an approach detection apparatus 15. An actuating object, approaching the touch-sensitive surface 14 can be detected by means of the approach detection apparatus 15. The actuating object can, for example, be the fingertip of a user. Such approach detection apparatuses are known per se. The approach detection apparatus 15 is also coupled over a data transmitting link with the control device 11. It transmits a signal to the control device 11 if it has been detected that an actuating object is located within a detection area in front of the touch-sensitive surface 14.

If a user touches the touch-sensitive surface 14 in a specific area with an actuating object, a corresponding signal is transmitted to the control device 11. The control device 11 can, in this way, detect the actuation of a switching element displayed on the display surface 13 in conjunction with the corresponding display on the display surface 13. If the actuation of a switching element has been detected, the control device 11 can generate control signals for the adjusting apparatuses 7, 8, 9 of the vehicle seat 1 and move the seat elements 2, 3-1, 3-2, 4-1, 4-2. Furthermore, it can change the display on the display surface 13.

The adjusting apparatuses 7, 8, 9 can optionally transmit confirmation signals for the movement of the seat elements 2, 3-1, 3-2, 4-1, 4-2 back to the control device 11 such that the latter can generate graphic elements, in particular moving graphic elements, for the display surface 13 depending on the confirmation signals.

Different displays for displaying on the display surface 13 are generated by the control device 11. In this embodiment, the display depends on the selection of a seat element 2 or respectively a pair of seat elements 3-1, 3-2 or respectively 4-1, 4-2. The display comprises graphic elements as well as switching elements for adjusting the various seat elements 2, 3-1, 3-2, 4-1, 4-2 of the vehicle seat 1.

Various basic display screens which can be generated by the control device 11 and which are generated by an exemplary embodiment of a method for adjusting at least a first movable seat element of a vehicle seat are explained with reference to FIGS. 2 to 4:

A graphic element 10 of the vehicle seat 1 to be adjusted is displayed on the display screen. This graphic element 10 comprises graphic elements 50, 60 for the seating surface 5 and the back surface 6. In addition, the graphic element 10 comprises a graphic element 20 for the knee element 2, graphic elements 30-1, 30-2 for the seating surface side panels 3-1, 3-2 and graphic elements 40-1, 40-2 for the back surface side panels 4-1, 4-2.

If no actuating object is located in the detection area of the approach detection apparatus 15, all of the graphic elements are shown as display elements which cannot be actuated. If, however, it has been detected by the approach detection apparatus 15 that an actuating object is located in the detection area, the display elements are converted into switching elements which the user can actuate by touch. The conversion of a display element into a switching element is visualized in that the corresponding switching element is shown brighter. Alternatively or additionally, a contour around the corresponding switching element is shown. If the user approaches the touch-sensitive surface 14, for example with his fingertip, a conversion of various display elements into switching elements, therefore, takes place on the entry of his fingertip into the detection area such that the user can quickly identify which actuation possibilities are available to him. By touching one of the graphic elements 20, 30-1, 30-2, 40-1, 40-2 for one of the seat elements 2, 3-1, 3-2, 4-1, 4-2, the user can select a seat element 2 or respectively a pair of seat elements 3-1, 3-2 or 4-1, 4-2. Such a selection is detected by means of the touch-sensitive surface 14. The control device 11 subsequently generates a changed representation for the graphic element of the selected seat element. The corresponding graphic element is shown as if a gel-like colored fluid is filling the corresponding graphic element.

Figure 2:
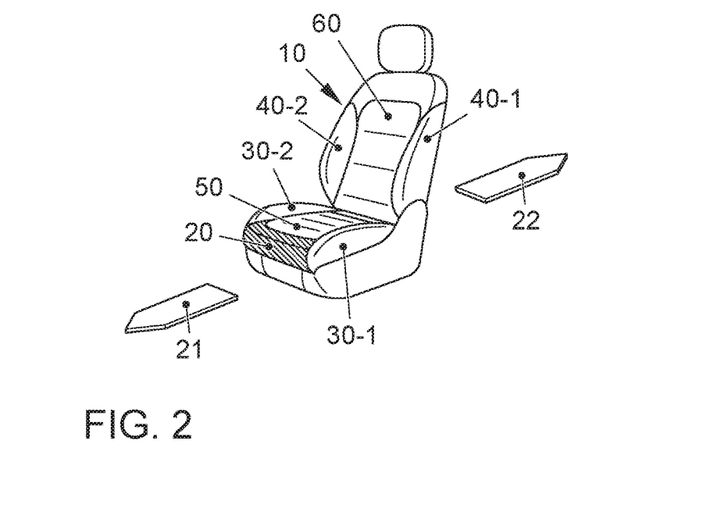
FIG. 2 shows a first display on the display surface which is generated by an exemplary embodiment of a method for adjusting at least a first movable seat element of a vehicle seat.

A display screen which is generated if the knee element 2 has been selected is shown in FIG. 2. The graphic element 20 is shown in color as the selected graphic element. In addition, switching elements for the actuation of the adjustment of the knee element 2 are displayed. The first switching element is a graphic arrow element 21 which points forwards in the case of the perspective representation 10 of the vehicle seat 1. The second switching element is a graphic arrow element 22 which points backwards in the case of this perspective representation.

Figure 3:
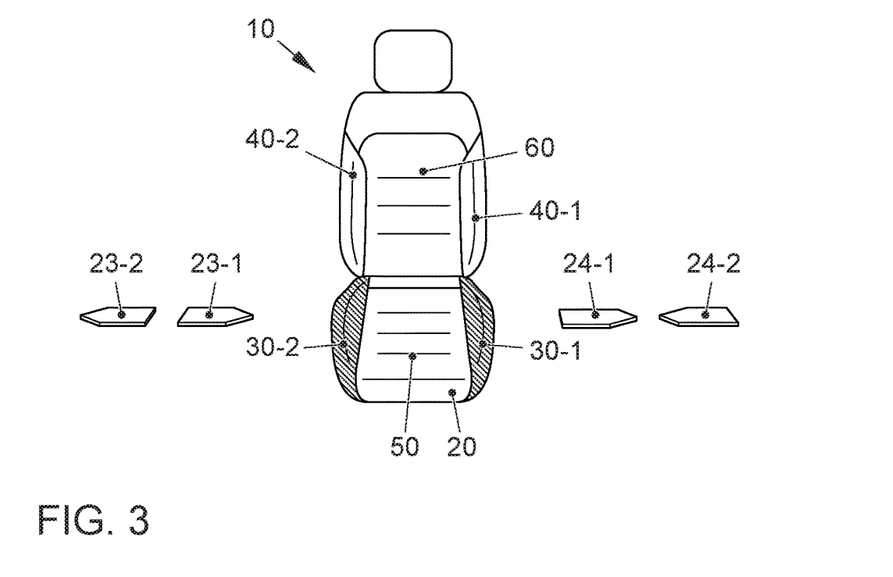
FIG. 3 shows a further display on the display surface which is generated by the exemplary embodiment.

FIG. 3 shows the display screen on the display surface 13 if the seating surface side panels 3-1, 3-2 have been selected. The corresponding graphic elements 30-1, 30-2 are, in this case, shown in color filled with the gel-like fluid. In addition, further switching elements for actuating the possible movements of the seating surface side panels 3-1, 3-2 are displayed. A third switching element is two graphical arrow elements 23-1 and 23-2 which point away from one another. If the user actuates this switching element, a control signal is generated by the control device 11, which control signal moves the seating surface side panels 3-1 and 3-2 away from one another.

In addition, a fourth switching element comprising graphic arrow elements 24-1 and 24-2 which point towards one another is displayed. If this fourth switching element is actuated, a control signal is generated by the control device 11, by means of which control signal the seating surface side panels 3-1 and 3-2 are moved towards one another.

Figure 4:
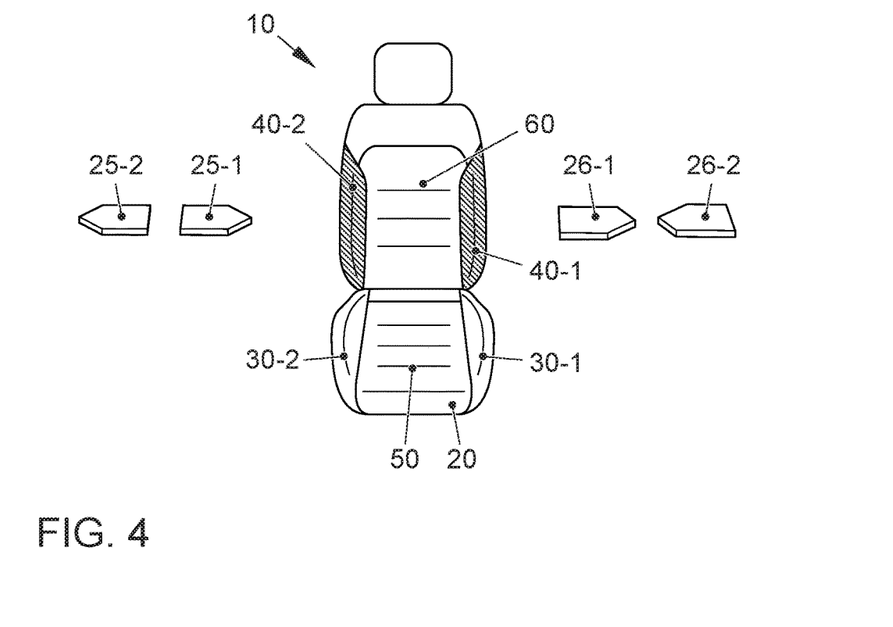
FIG. 4 shows a further display on the display surface which is generated by the exemplary embodiment.

FIG. 4 shows the display if the back surface side panels 4-1, 4-2 have been selected. The corresponding graphic elements 40-1 and 40-2 are, in this case, shown in color and filled with the gel-like fluid. In addition, further switching elements for actuating the adjustment of the back surface side panels 4-1, 4-2 are displayed. A fifth switching element comprises graphical arrow elements 25-1 and 25-2 which point away from one another, and a sixth switching element comprises graphic arrow elements 26-1 and 26-2 which point towards one another. On actuating the fifth switching element a control signal is generated by the control device 11, by means of which control signal the back surface side panels 4-1, 4-2 are moved away from one another and on actuation of the sixth switching element a control signal is generated by the control device 11, by means of which control signal the back surface side panels 4-1 and 4-2 are moved towards one another.

Another exemplary embodiment of the method for adjusting at least a first movable seat element of a vehicle seat is explained in the following with reference to FIGS. 5 to 16. Display screens shown on the display surface 13 during the execution of the method are reproduced in FIGS. 5 to 16.

Figure 5:
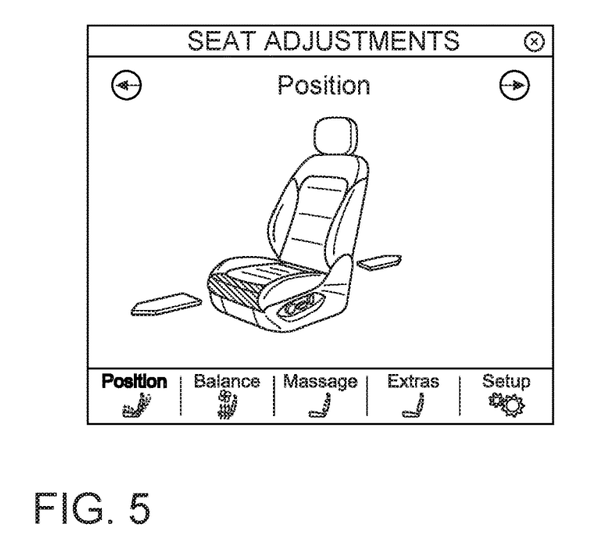
FIGS. 5 to 16 illustrate animations generated by the exemplary embodiment of the method during a change in the selection of seat elements.

An initial situation is shown in FIG. 5. The knee element 2 is selected such that the corresponding graphic element 20 is shown in color. The remaining switching elements are shown brighter and not in color and with a contour. In addition, the graphic arrow elements 21 and 22 are displayed. The graphic arrow elements 21 and 22 are arrow buttons which are shown in the plane of the graphic element 50 for the seating surface 5. If the user actuates one of these arrow elements 21 or 22, a control signal is generated by the control device 11, by means of which control signal the knee element 2 is displaced forwards or backwards. The graphic element 20 which is assigned to the knee element 2 is also moved at the same time as this physical movement of the knee element 2. In one exemplary embodiment, the graphic element 20 is moved back and forth for the same length of time that the user touches one of the arrow elements 21 or respectively 22. In this case, it is therefore only illustrated that the knee element 2 is moved. The movement of the graphic element 20 does not take place synchronously with the actual movement of the knee element 2.

If, however, in a corresponding embodiment, the first adjusting apparatus 7 transmits a confirmation signal for the movement of the knee element 2 back to the control device 11, the control device 11 synchronizes the displayed movement of the graphic element 20 with the real movement of the knee element 2.

Figure 6:
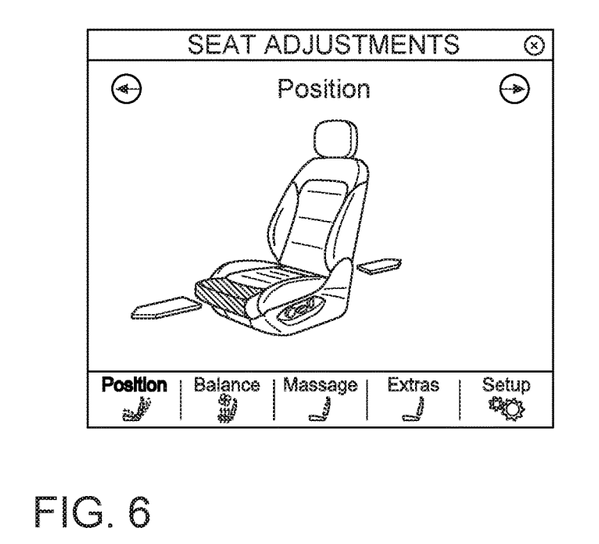

The movement of the graphic element 20 is shown in FIG. 6, in which it can be seen that the graphic element 20 has been moved forwards such that the seat depth has been increased.

Figure 7:
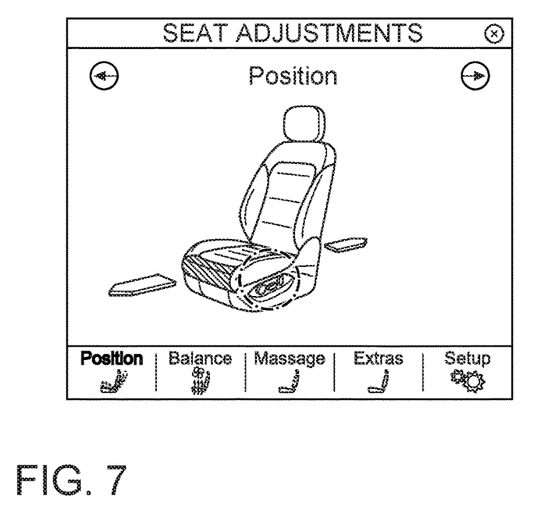
Figure 8:
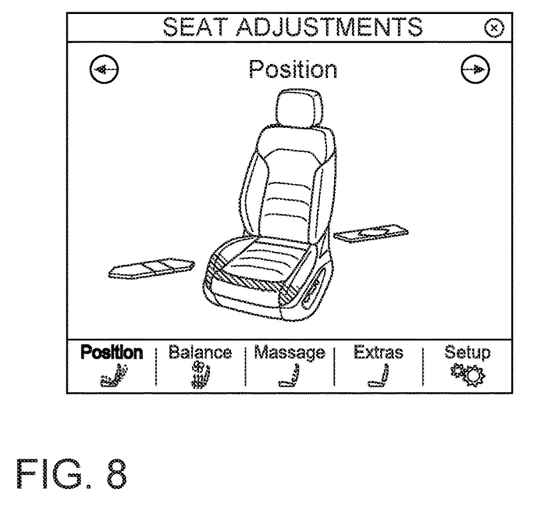
Figure 9:
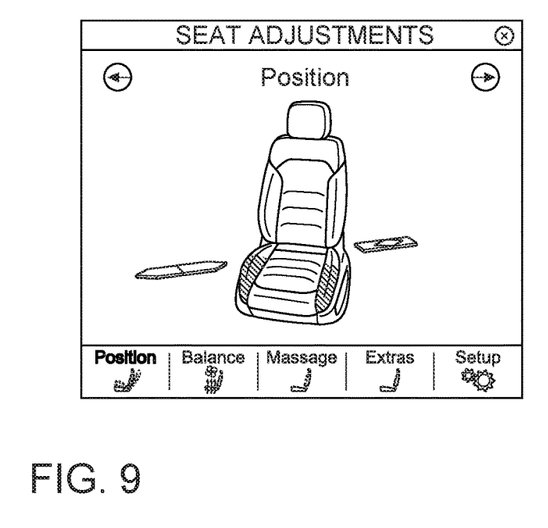
Figure 10:
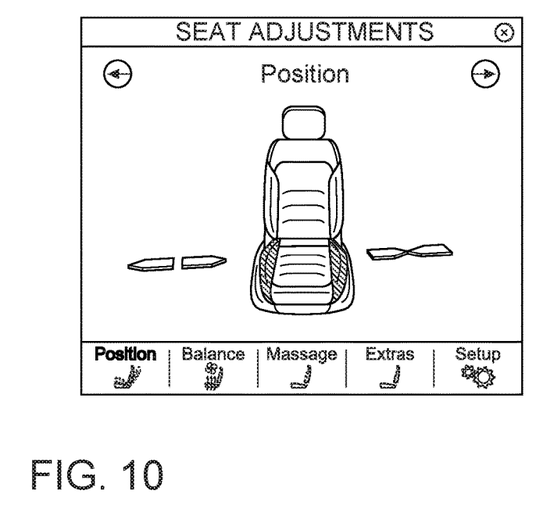

FIG. 7 shows that the graphic element 20 has been moved back again. This illustrates the back and forth movement of the graphic element 20 according to the exemplary embodiment described herein.

If the user now touches the graphic element 30-1 or the graphic element 30-2 in order to adjust the seating surface side panels 3-1, 3-2, the selection changes from the knee element 2 to the seating surface side panels 3-1, 3-2. An animation is reproduced on the display screen for the transition of this selection. The highlighting of the graphic elements 20 as well as 30-1 and 30-2 change in this animation. The animation shows that the graphically shown gel-type colored fluid flows from the graphic element 20 for the knee element 2 into the graphic elements 30-1 and 30-2 for the seating surface side panels 3-1 and 30-2. At the end of the animation, the graphic elements 30-1 and 30-2 are shown completely in color as if they were filled with the colored fluid.

Figure 11:
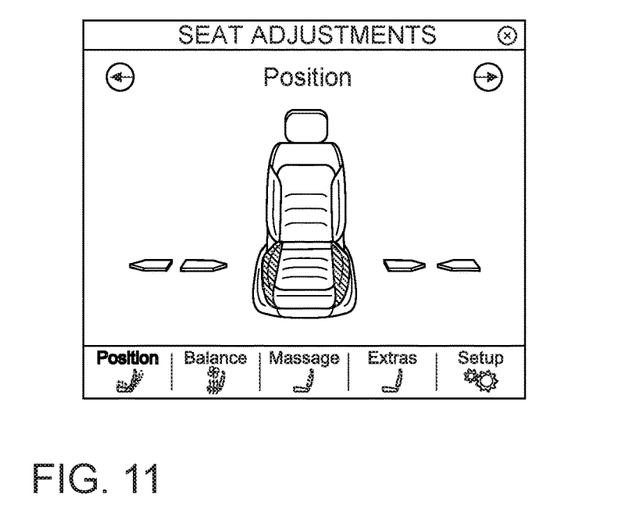
Figure 12:
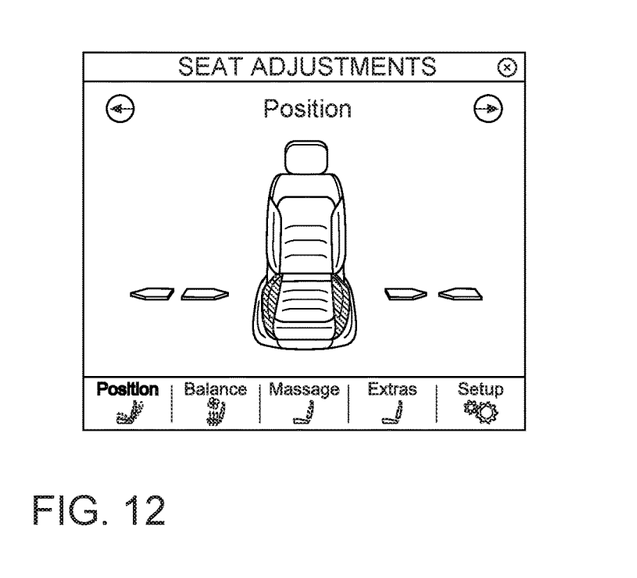

In addition, the graphic arrow elements 21 and 22 change. This is shown in FIGS. 8 to 11. The arrow element 21 turns into a double-headed arrow, which then separates until finally the graphical arrow elements 23-1 and 23-2 are displayed as shown in FIG. 11. At the same time, the perspective representation of the graphic element 10 for the vehicle seat 1 rotates such that at the end of the animation the graphic element 10 shows the vehicle seat 1 from the front. During the transition of the arrow element 21 into the arrow elements 23-1, 23-2 these arrow elements are also rotated such that they are shown at the end with their arrow buttons in the plane of the graphic element 50 for the seating surface 5.

Accordingly, the graphic arrow element 22 is changed such that it turns into a bar which finally separates until the arrow elements 24-1 and 24-2 pointing towards one another are displayed in the plane of the graphic element 50 for the seating surface 5.

If, in this state, the third switching element is actuated with the arrow elements 23-1, 23-2, a control signal is generated by the control device 11, by means of which control signal the seating surface side panels 3-1, 3-2 are moved apart. At the same time as this real movement of the seating surface side panels 3-1, 3-2, the corresponding graphic elements 30-1, 30-2 are moved back and forth, as is evident on comparing FIGS. 11 and 12. Similarly, a control signal is generated on actuating the fourth switching element with the arrow elements 24-1, 24-2, by means of which control signal the seating surface side panels 3-1, 3-2 are moved towards one another. In this case as well, the corresponding graphic elements 30-1, 30-2 are moved back and forth at the same time. The back and forth movement is, in each case, effected such that the seating surface side panels shown by the graphic elements 30-1 and 30-2 are moved towards one another and away from one another. In this case, it is also possible in one exemplary embodiment, that the movement of the graphic elements 30-1 and 30-2 is synchronized with the real movement of the seating surface side panels 3-1, 3-2.

Figure 13:
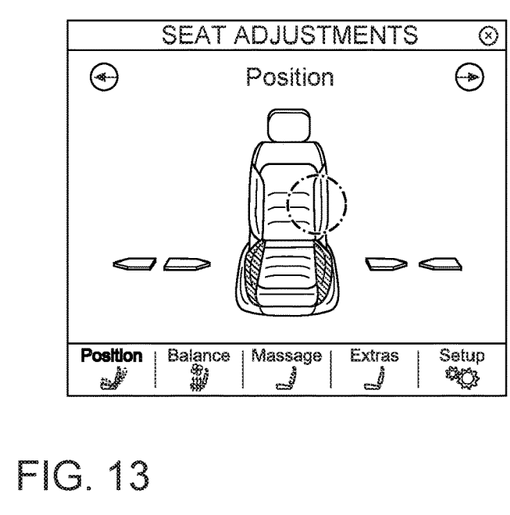
Figure 14:
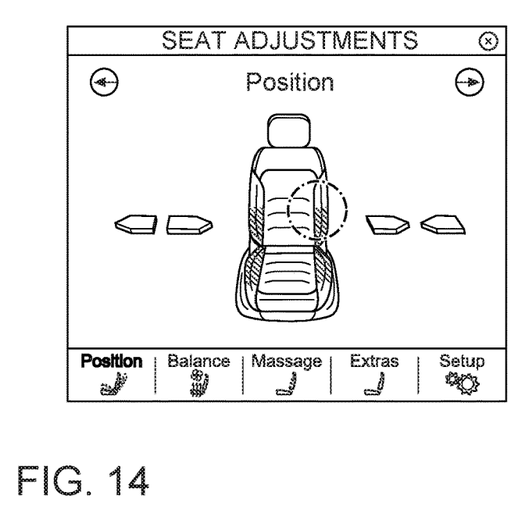
Figure 15:
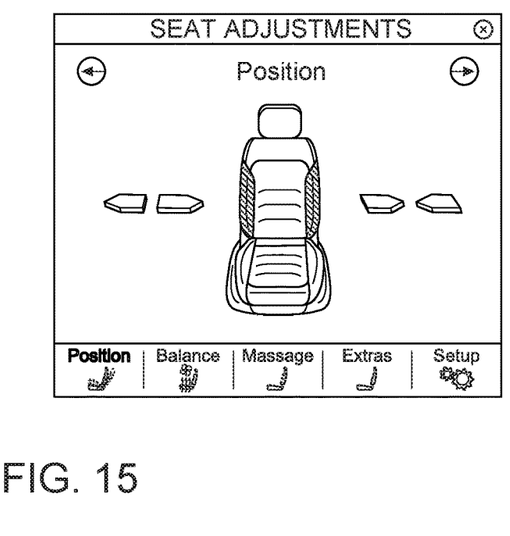

If the user then selects the back surface side panels 4-1, 4-2 by touching the graphic elements 40-1 or 40-2, an animation is again generated, in which the graphic elements 30-1, 30-2 and 40-1, 40-2 are changed such that the impression is created that the colored gel-like fluid from the graphic elements 30-1, 30-2 flows into the graphic elements 40-1, 40-2 and finally fills these completely such that they are shown in color at the end. Similarly, the arrow elements 23-1, 23-2, 24-1, 24-2 are moved upwards and are rotated with respect to their surface alignment such that they are displayed at the end in the plane of the graphic element 60 for the back surface 6, as is shown in FIGS. 13 to 15.

During an actuation of the fifth switching element with the arrow elements 25-1, 25-2 a control signal is generated, by means of which the back surface side panels 4-1 and 4-2 are moved away from one another. At the same time, the graphic elements 40-1, 40-2 are moved back and forth towards one another and away from one another, as can be seen on comparing FIGS. 15 and 16. As described in the preceding, the movement of the graphic elements 40-1 and 40-2 can alternatively also be effected synchronously with the real movement of the back surface side panels 4-1 and 4-2 in a corresponding embodiment.

Figure 16:
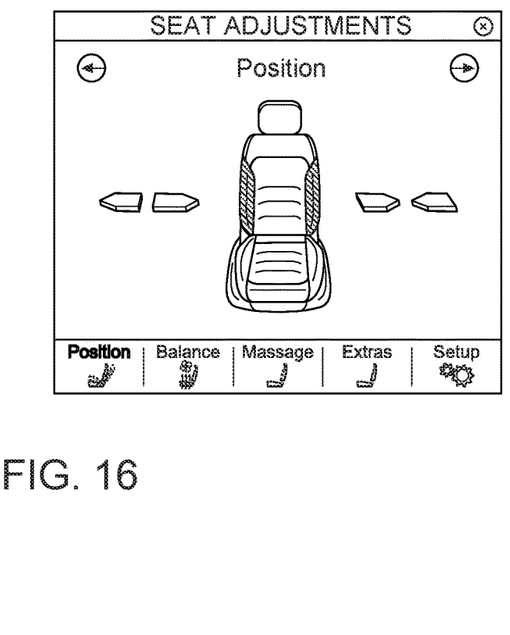

If the sixth switching element is actuated with the arrow representations 26-1, 26-2, a control signal is generated by the control device 11, by means of which control signal the back surface side panels 4-1, 4-2 are moved towards one another. Accordingly, the graphic elements 40-1 and 40-2 are at the same time moved back and forth towards one another and away from one another or alternatively synchronously with the movement of the back surface side panels 4-1, 4-2.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit may fulfill the functions of several items recited in the claims.

The mere fact that certain measures are recited in mutually different dependent claims or embodiments does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims or elsewhere should not be construed as limiting the scope.

LIST OF REFERENCE NUMERALS

1 Vehicle seat
2 Knee element
3-1, 3-2 Seating surface side panels
4-1, 4-2 Back surface side panels
5 Seating surface
6 Back surface
7 Adjusting apparatus
8 Adjusting apparatus
9 Adjusting apparatus
10 Graphic element
11 Control device
12 Display device
13 Display surface
14 Touch-sensitive surface
15 Approach detection apparatus
20 Graphic element
21 Arrow element
22 Arrow element
23-1, 23-2 Arrow element
24-1, 24-2 Arrow element
25-1, 25-2 Arrow element
26-1, 26-2 Arrow element
30-1, 30-2 Graphic element
40-1, 40-2 Graphic element
50 Graphic element
60 Graphic element

What is claimed is:

1. A method for adjusting at least a first movable seat element of a vehicle seat, in which
   a graphic element of the vehicle seat to be adjusted is displayed with at least one graphic element of the first seat element on a display surface;
   in order to adjust the first seat element, a first switching element and a second switching element are displayed on the display surface, wherein the first switching element comprises a first graphic arrow element and the second switching element comprises a second graphic arrow element, which graphic arrow elements indicate opposite directions for moving the first seat element;
   upon actuating the first switching element, a control signal is generated, by which the first seat element is moved in a first direction; and
   due to the control signal and at the same time, the graphic element of the first seat element is moved; wherein
   the vehicle seat to be adjusted has a pair of seat elements, comprising a second seat element and a third seat element, which are movable towards one another and away from one another;
   the graphic element of the vehicle seat to be adjusted shows graphic elements for the second and third seat elements that are displayed on the display surface;
   in order to adjust the pair of seat elements, a third switching element, which comprises a third graphic arrow element and a fourth graphic arrow element, and which point away from one another, and a fourth switching element, which comprises a fifth arrow element and a sixth arrow element, which point towards one another are displayed on the display surface; and
   upon actuating the third switching element, a control signal is generated, by which the second and third seat elements of the pair of seat elements are moved away from one another and, at the same time, the graphic elements of the second and third seat elements are moved and on actuating the fourth switching element, a control signal is generated, by which the second and third seat elements of the pair of seat elements are moved towards one another and, at the same time, the graphic elements of the second and third seat elements are moved.

2. The method according to claim 1, wherein
   the vehicle seat has a further pair of seat elements comprising a fourth seat element and a fifth seat element, which can be moved towards one another and away from one another;
   the graphic element of the vehicle seat to be adjusted shows graphic elements for the fourth and fifth seat elements that are displayed on the display surface;
   in order to adjust the further pair of seat elements a fifth switching element, which comprises a seventh graphic arrow element and an eighth graphic arrow element, which point away from one another, and a sixth switching element, which comprises a ninth arrow element and a tenth arrow element which point towards one another, are displayed on the display surface;
   upon actuating the fifth switching element, a control signal is generated, by which the fourth and fifth seat elements of the further pair of seat elements are moved away from one another and, at the same time, the graphic elements of the fourth and fifth seat elements are moved and on actuating the sixth switching element, a control signal is generated, by which the fourth and fifth seat elements of the further pair of seat elements are moved towards one another and, at the same time, the graphic elements of the fourth and fifth seat elements are moved.

3. The method according to claim 2, wherein the fourth and fifth seat elements of the further pair of seat elements are back surface side panels.

4. The method according to claim 1, wherein the movement of the graphic elements for one of the seat elements or for the seat elements corresponds to the movement of the respective seat element or the respective seat elements.

5. The method according to claim 1, wherein the graphic elements of the seat elements are configured as switching elements and that by an actuation of one of these switching elements, the respective seat element or the respective pair of seat elements is selected.

6. The method according to claim 1, wherein an animation is reproduced on the display surface if a transition is made from a selection of the first seat element to a selection of the pair of seat elements with the second and third seat elements.

7. The method according to claim 6, wherein the animation comprises that the first graphic arrow element first turns into a double-headed arrow which then divides into the third and fourth graphic arrow elements, and the second graphic arrow element first turns into a bar, which then divides into the third and fourth graphic arrow elements.

8. The method according to claim 7, wherein a selected seat element or selected seat elements is/are shown highlighted in the graphic element of the vehicle seat by an area fill and the animation comprises that the area fill for highlighting the graphic element of the first seat element disappears and the area fill for highlighting the graphic elements of the pair of seat elements appears, wherein the disappearance and the appearance of the area fill are shown in the form of a flow of a fluid from the graphic element of the first seat element to the graphic elements of the pair of seat elements.

9. The method according to claim 6, wherein a selected seat element or selected seat elements is/are shown highlighted in the graphic element of the vehicle seat by an area fill and the animation comprises that the area fill for highlighting the graphic element of the first seat element disappears and the area fill for highlighting the graphic elements of the pair of seat elements appears, wherein the disappearance and the appearance of the area fill are shown in the form of a flow of a fluid from the graphic element of the first seat element to the graphic elements of the pair of seat elements.

10. The method according to claim 1, wherein an operating object approaching a touch-sensitive surface of an input apparatus is detected and, if the operating object approaching the touch-sensitive surface has been detected, switching elements which can be actuated are shown highlighted.

11. The method according to claim 1, wherein the back and forth movement of the first seat element changes the seat depth of the vehicle seat.

12. The method according to claim 1, wherein the second and third seat elements of the pair of seat elements are seating surface side panels.

13. A device for adjusting at least a first movable seat element of a vehicle seat comprising a first adjusting apparatus for moving the first seat element;

a display device having a display surface for displaying a graphic element of the vehicle seat to be adjusted with at least one graphic element of the first seat element, wherein to adjust the first seat element, a first switching element and a second switching element is displayable on the display surface, wherein the first switching element comprises a first graphic arrow element and the second switching element comprises a second graphic arrow element, which graphic arrow elements indicate opposite directions for moving the seat element; and a control device, which is coupled with the first adjusting apparatus and the display device by a data transmitting link, and which is configured to, on actuating the first switching element, to generate a control signal, by which the first seat element is moved in a first direction and, at the same time, the graphic element of the first seat element is moved; wherein the control device is configured, so that the control signal, which is generated by actuating the first switching element, simultaneously moves the graphic element of the first seat element;

the vehicle seat to be adjusted has a pair of seat elements, comprising a second seat element and a third seat element, which are movable towards one another and away from one another;

the graphic element of the vehicle seat to be adjusted shows graphic elements for the second and third seat elements that are displayable on the display surface;

in order to adjust the pair of seat elements, a third switching element, which comprises a third graphic arrow element and a fourth graphic arrow element, and which point away from one another, and a fourth switching element, which comprises a fifth arrow element and a sixth arrow element, which point towards one another are displayable on the display surface; and the control device is configured, so that upon actuating the third switching element, a control signal is generated, by which the second and third seat elements of the pair of seat elements are moved away from one another and, at the same time, the graphic elements of the second and third seat elements are moved, and on actuating the fourth switching element, a control signal is generated, by which the second and third seat elements of the pair of seat elements are moved towards one another and, at the same time, the graphic elements of the second and third seat elements are moved.

14. The device according to claim 13, further comprising a touch-sensitive surface for actuating the switching elements.

15. The device according to claim 14, further comprising an approach detection device, with which an actuating object approaching the touch-sensitive surface can be detected.

* * * * *